United States Patent Office 3,499,885
Patented Mar. 10, 1970

3,499,885
PYRIMIDINYL- OR DIAZEPINYL-THIOACET-
AMIDOPENICILLANIC ACIDS
Leonard Bruce Crast, Jr., Clay, N.Y., assignor to Bristol-
Myers Company, New York, N.Y., a corporation of
Delaware
No Drawing. Filed Dec. 6, 1968, Ser. No. 781,993
Int. Cl. C07d 99/16
U.S. Cl. 260—239.1                          3 Claims

ABSTRACT OF THE DISCLOSURE

This invention relates to certain 6-[α-(3,4,5,6-tetra-hydro-2-pyrimidinylthio)- and 6-[α-(1H-4,5,6,7-tetra-hydro-1,3-diazepinyl - 2 - thio)-acetamido]-penicillanic acids and to processes for the preparation thereof. A typical example would be the reaction of 6-(α-bromo-acetamido)-penicillanic acid with 2-mercapto-3,4,5,6-tetrahydropyrimidine to produce 6-[α-(3,4,5,6-tetrahydro-2-pyrimidinylthio)-acetamido]-penicillanic acid. The compounds of the invention are antibacterial agents.

BACKGROUND OF THE INVENTION

Field of the invention

This invention relates to chemical compounds useful as antibacterial agents in the treatment of infectious diseases caused by Gram-positive and Gram-negative bacteria in mammals, and particularly in man.

Description of the prior art

There exists a need to provide alternative and improved agents for the treatment of infections caused by various strains of bacteria, or for the decontamination of objects bearing such organisms, e.g., hospital equipment, etc.

SUMMARY OF THE INVENTION

The 6-[α-(3,4,5,6-tetrahydro-2-pyrimidinylthio)-acet-amido]-penicillanic acids of the present invention are compounds having the formula

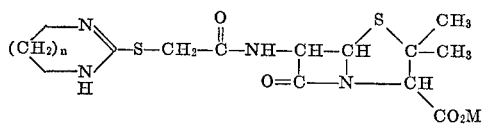

wherein $n$ is an integer of 1 or 2; and M is hydrogen or a pharmaceutically acceptable nontoxic cation.

This invention relates to new synthetic compounds of value as antibacterial agents, as nutritional supplements in animal feeds, as agents for the treatment of mastitis in cattle, and as therapeutic agents in poultry and animals, including man, in the treatment of infectious diseases caused by Gram-positive and Gram-negative bacteria and more particularly relates to certain 6-[α-(3,4,5,6-tetra-hydro-2-pyrimidinylthio)- and 6-[α-(1H-4,5,6,7-tetrahy-dro-1,3-diazepinyl-2-thio)-acetamido]-penicillanic acids, related salts and derivatives thereof, and to the process for the preparation of same.

Antibacterial agents in the past have proven highly effective in the therapy of infections due to either Gram-positive or Gram-negative bacteria but few are effective against both. It was the objective of the present invention to provide novel compounds effective against both Gram-positive and Gram-negative bacteria including resistant strains.

It was a further object of the present invention to provide penicillins active against Gram-positive and Gram-negative bacteria which are also efficiently absorbed upon parenteral or oral administration to man and animals.

The objects of the present invention have been achieved by the provision, according to the present invention, of the compounds of the formula

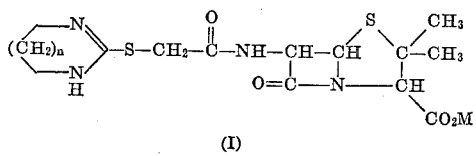

(I)

wherein $n$ is an integer of 1 or 2; and M is hydrogen or a pharmaceutically acceptable nontoxic cation.

The term "(lower)alkyl" as used herein means both straight and branched chain aliphatic hydrocarbon radicals having from 1 to 6 carbon atoms such as methyl, ethyl, propyl, isopropyl, butyl, isobutyl, t-butyl, amyl, hexyl, etc. Similarly, where the term "(lower)" is used as part of the description of another group, e.g. "(lower)alkoxy," it refers to the alkyl portion of such group which is therefore as described above in connection with "(lower)alkyl" and thus includes such radicals as methoxy, ethoxy, isopropoxy, etc.

A preferred group of compounds within the present invention is the group having the formula

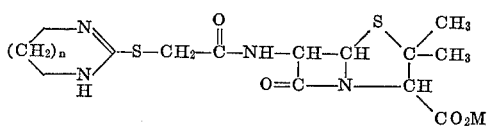

wherein $n$ is an integer of 1 or 2; and M is hydrogen or a pharmaceutically acceptable nontoxic cation.

a most preferred embodiment within the present invention is the compound having the formula

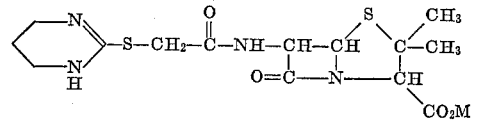

(II)

wherein M is hydrogen or a pharmaceutically acceptable nontoxic cation

Another most preferred embodiment is the compound having the formula

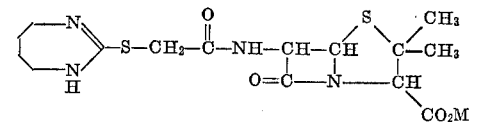

(III)

wherein M is hydrogen or a nontoxic, pharmaceutical acceptable cation.

The pharmaceutically-acceptable, nontoxic cations include metallic cations such as sodium, potassium, calcium and aluminum and organic amine cations such as tri-alkylamines, e.g. triethylamine, procaine, dibenzylamine, N-benzyl-β-phenethylamine, 1-ephenamine, N,N'-di-benzylethylenediamine, dehydroabietylamine, N,N'-bis-dehydroabietylethylenediamine, N-(lower) - alkylpiperi-dines, e.g. N-ethylpiperidine, and other amines which have been used to form salts with benzylpenicillin.

As the compounds of the present invention are by definition capable of forming salts with acids due to their basic nitrogen functions, the compounds are in a sense amphoteric and include the nontoxic acid addition salts thereof (i.e., the amine salts) including the mineral acid addition salts such as the hydrochloride, hydrobromide, hydroiodide, sulfate, sulfamate and phosphate and the organic acid addition salts such as the maleate, acetate, citrate, succinate, benzoate, tartrate, fumarate, malate, mandelate, ascorbate and the like.

The compounds of the present invention are prepared by a new and novel two step process. Heretofore it has been common practice to acylate 6-aminopenicillanic acid with an acyl halide or its functional equivalent. This method produces good yields and a high quality product under normal conditions but is sometimes not conducive to either good yield or high quality product when the acylating agent's side chain contains a basic nitrogen function such as a primary or secondary amine which is capable of forming amides. In the preparation of the amine containing acylating agent, it is not uncommon for the acyl halide or its functional equivalent to self-condense producing polmeric tars and decomposition product unless the acylating agent is prepared and maintained as the acid halide hydrohalide. The two step process of the present invention avoids this problem and produces products in yields that are commercially valuable.

The products of the present invention are prepared in a two-step process:

(1) A compound of the formula

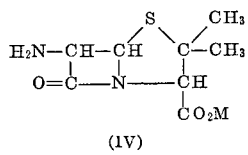

(IV)

wherein M is described above (preferably in the form of a neutral salt such as the sodium salt or the triethylamine salt) is mixed with an acid halide having the formula

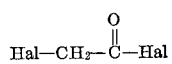

in which Hal is a halogen such as chloro, bromo or iodo or with its functional equivalent as an acylating agent for a primary amino group to produce a compound having the formula

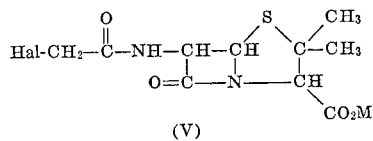

(V)

The preferred acylating agent is a haloacetyl halide, most preferably bromoacetyl bromide.

Functional equivalents include the corresponding acid anhydrides, including mixed anhydrides and particularly the mixed anhydrides prepared from stronger acids such as the lower aliphatic monoesters of carbonic acid, or alkyl and aryl sulfonic acids and of more hindered acids such as diphenylacetic acid.

In addition, an acid azide or an active ester or thioester (e.g. with p-nitro-phenol, 2,4-dinitrophenyl, thiophenol, thioacetic acid) may be used or the free acid itself may be coupled with 6-aminopenicillanic acid after first reacting said free acid with N,N'-dimethylchloroformiminium chloride [cf. Great Britain 1,008,170 and Novak and Weichet, Experientia XXI/6,360 (1965)] or by the use of enzymes or of an N,N'-carbonyldiimidazole or an N,N'-carbonylditriazole [cf. South African patent specification 63/2,684] of a carbodiimide reagent [especially N,N'-dicyclohexylcarbodiimide, N,N' - diisopropylcarbodiimide or N-cyclohexyl - N' - (2-morpholinoethyl)carbodiimide; [cf. Sheehan and Hess, J, Amer. Chem. Soc. 77, 1067, (1955)], or of alkynylamine reagent [cf. R. Buijle and H. G. Viehe, Angew Chem. International Edition 3, 582 (1964)], or of a ketenimine reagent [cf. C. L. Stevens and M. E. Mond, J. Amer. Chem. Soc. 80, 4065 (1958)] or of an isoxazolium salt reagent [cf. R. B. Woodward, R. A. Olofson and H. Mayer, J. Amer. Chem. Soc. 83, 1010 (1961)]. Another equivalent of the acid chloride is a corresponding azolide, i.e. an amide or the corresponding acid whose amide nitrogen is a member of a quasiaromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The byproduct, imidazole, precipitates and may be separated and the imidazolide isolated, but this is not essential. The methods for carrying out these reactions to produce a penicillin and the methods used to isolate the penicillin so produced are well-known in the art.

(2) The second step of the process is performed by mixing together material having the Formula V with a basic nitrogen containing mercaptan having the formula

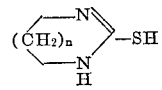

wherein n is an integer of 1 or 2; to produce compounds of the Formula I

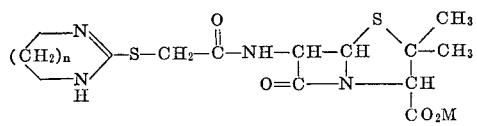

The compounds of the present invention have also been achieved by the provision according to the present invention of the process for the preparation of the compound having the formula

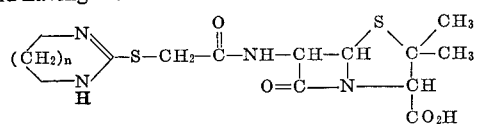

wherein n is an integer of 1 or 2; and the pharmaceutically acceptable, nontoxic salts thereof; which comprises mixing a compound having the formula

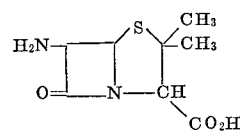

IV(a)

with an acid halide having the formula

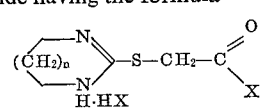

in which X is chloro, bromo or iodo, but preferably chloro, in a molar ratio of at least one mole of acid halide hydrohalide per mole of Compound IV(a) but preferably in a ratio of 1.0 to 1.4 moles of acid halide per mole of Compound IV(a);

In an organic solvent selected from the group comprised of methylene chloride, dichloroethane, ethyl acetate, chloroform, or the like, but preferably methylene chloride;

In the presence of an excess of tertiary amine such as pyridine, triethylamine, trimethylamine, or the like, but preferably triethylamine, and preferably in a ratio of at least 3 moles of tertiary amine per mole of acid halide hydrohalide;

At a temperature in the range of about −25° C. to +35° C., but preferably about −5° C. to +5° C.

The first process for the preparation of the compounds of the instant invention is usually performed by dissolving a one molar quantity of a compound having the Formula IV in a 2:1 water-acetone solution which is buffered with 3 moles of a bicarbonate.

The solution is rapidly stirred and cooled to 0° C. and one mole of a haloacetyl halide, preferably bromoacetyl bromide, is added rapidly. The temperature is maintained at 0° C. —5° C. for ten minutes and then stirred for an additional one hour as the temperature is allowed to approach 25° C. The mixture is concentrated in vacuo at 20° C. to about one-half volume and then doubled in volume by the addition of water. Two ether extractions are made and the ether extracts discarded. The aqueous solution is covered by a layer of ethyl acetate or its equivalent, stirred and cooled during which time the solution is acidified to pH 2 by the addition of 40% $H_3PO_4$.

The mixture is filtered and the ethyl acetate layer separated, washed with water, dried over sodium sulfate, filtered, and then treated with a solution of sodium or potassium 2-ethylhexanoate (SEH-KEH) in n-butanol. The oil which forms is scratched to induce crystallization. The resultant crystals are collected, washed several times with acetone and dried in vacuo over $P_2O_5$ to yield a sodium or potassium 6-(α-bromoacetamido)-penicillanate or derivative of same corresponding to the starting material.

The bromoacetamidopenicillanate derivative is dissolved in a quantity of water at room temperature and is rapidly stirred during the dropwise addition over a one hour period of a solution composed of equimolar quantities of a basic nitrogen substituted mercaptan and an alkali carbonate, i.e., sodium, potassium, etc. Stirring is continued an additional 90 minutes following which 40% phosphoric acid is added until pH 2.5–3.0 is reached. The product, which usually crystallizes, is collected, then washed with water and ethyl acetate to yield desired material of Formula I.

In the process for the preparation of the compounds of Formulae I and V above, the compounds are sometimes in aqueous solution in the form of their sodium or potassium salt. These compounds in the aqueous phase can then be converted to the free acid, preferably in the cold under a layer of organic solvent by the addition of mineral acid, e.g. 40% $H_3PO_4$ to pH 2–3. The free acid can then be extracted into a water-immiscible, neutral organic solvent such as ethyl acetate, the extract washed with water quickly in the cold, if desired, and dried, as with anhydrous $Na_2SO_4$ and the free acid recovered from the organic solvent solution. The product in the ethyl acetate extract in its free acid form can then be converted to any desired metal or amine salt, particularly the pharmaceutically acceptable nontoxic amine salts described above, by treatment with the appropriate base, e.g. a free amine such as procaine base or a solution of potassium 2-ethylhexanoate in dry n-butanol. These salts are usually insoluble in solvents such as ethyl acetate and can be recovered in pure form by simple filtration.

The objectives of the present invention have been achieved, by the provision according to the present invention, of the process for the synthesis of 6-[α-(substituted-thio)-acetamido]-penicillanic acids which comprises the consecutive steps of (a) Mixing together a compound having the formula

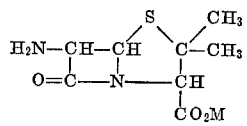

wherein M is hydrogen or a pharmaceutically acceptable nontoxic cation with about 1 to 1.5 molar equivalent, but preferably about 1 molar equivalent, of an α-haloacetylhalide having the formula

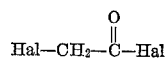

wherein Hal is a halogen selected from the group consisting of chloro, bromo and iodo, but is preferably bromo, or its functional equivalent as an acylating agent for a primary amino group in the presence of about 1 to 4.0 molar equivalents, but preferably 2 to 3 molar equivalents of a base selected from the group consisting of alkali metal carbonates and bicarbonates, i.e., $NaHCO_3$, $Na_2CO_3$, $KHCO_3$, $K_2CO_3$, etc., or pyridine, in a water-miscible ketonic solvent system such as water in combination with acetone, methyl isobutylketone (MIBK), butanone, etc., but preferably with acetone, at a temperature of about —20° C. to about 50° C., but preferably in the range of 0° C. to 25° C., to produce a compound having the formula

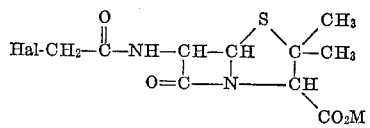

wherein M is as described above, and (b) Mixing said α-haloacetamido compound with about 1 to 1.5 molar equivalents, but preferably about 1 molar equivalent, of a mercaptan having the formula

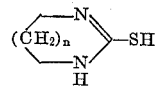

wherein n is an integer of 1 or 2, in the presence of about 1 to 1.5 molar equivalents, but preferably about 1 molar equivalent, of a base selected from the group consisting of an alkali metal hydroxide, bicarbonate and carbonate, i.e., NaOH, KOH, $Na_2CO_3$, $K_2CO_3$, $KHCO_3$, $NaHCO_3$, etc. in an aqueous solvent system at a temperature of about —20° C. to 50° C. but preferably in the range of about 10° C. to about 35° C. to produce a compound having the formula

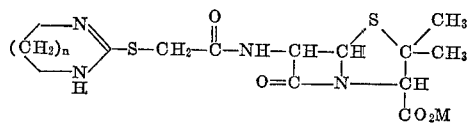

wherein n and M are as described above.

In the treatment of bacterial infections in man, the compounds of this invention are administered orally or parenterally, but preferably parenterally, in accordance with conventional procedures for antibiotic administration, in an amount of from about 5 to 60 mg./kg./day and preferably about 20 mg./kg./day in divided dosage, e.g. three to four times a day. They are administered in dosage units containing, for example, 125 or 250 or 500 mg. of active ingredient with suitable physiologically acceptable carriers or excipients. The dosage units can be in the form of liquid preparations such as solutions, dispersions or emulsions or in solid form such as tablets, capsules, etc.

Comparative MIC's for Compounds II (M=H) and III (M=H).

| | MIC (μg./ml.) | |
|---|---|---|
| | II | III |
| D. pneumoniae | 0.02 | ≤0.02 |
| St. pyogenes | 0.08 | 0.04 |
| S. aureus Smith | 0.3 | 0.3 |
| Sal. enteritidis | 0.3 | 0.3 |
| E. Coli Juhl | 0.6 | 0.6 |
| K. pneumoniae | 0.3 | 0.3 |

The following examples will serve to illustrate this invention without limiting it thereto. All temperatures are given in degrees centigrade.

In the examples below, 6–APA represents the compound having the formula

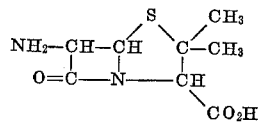

Likewise in the examples above, "MIC" represents the Minimum Inhibitory concentration in mcg./ml. of the compound required to inhibit the growth of the test organism described.

DESCRIPTION OF THE PREFERRED EMBODIMENTS

Example 1.—Potassium 6-(α-bromoacetamido)-penicillanate

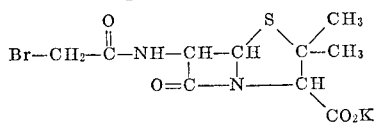

43.2 grams (0.2 mole) of 6-APA, 50.0 grams (0.45 mole) of NaHCO$_3$, 400 ml. of water and 200 ml. of acetone were mixed together, cooled to 0° C. and stirred rapidly while 40.4 grams (0.2 mole) of bromoacetyl bromide dissolved in 200 ml. of acetone was added in one fast addition. The temperature was kept at 0°–10° C. for ten minutes, then the ice-salt bath was removed and stirring continued for one hour as the temperature approached 25° C. The mixture was added to 500 ml. of water. Two 400 ml. ether extracts were made and discarded. The aqueous solution was covered with 500 ml. of ethyl acetate and vigorously stirred and cooled while being acidified to pH 2 with 40% phosphoric acid. The mixture was filtered, the ethyl acetate layer separated and washed with three 100 ml. portions of water, dried over Na$_2$SO$_4$, filtered and treated with 30 ml. of potassium 2-ethylhexanoate in n-butanol (34 ml.=0.1 mole). The product crystallized immediately. After stirring for twenty minutes the product was filtered off. The filter cake was washed with several portions of ethyl acetate, then air dried, and dried in vacuo over P$_2$O$_5$. The yield was 51.10 grams and decomposed at 190° C. The infrared (IR) and nuclear magnetic resonance (NMR) spectra were consistent with the above named compound, potassium 6-(α-bromoacetamido)penicillanate.

Analysis.—Calc'd for C$_{10}$H$_{12}$BrN$_2$O$_4$S(percent): C, 32.00; H, 3.23. Found (percent): C, 31.98; H, 3.49, (corrected for 1.51% water as determined by the Karl Fischer Method).

Example 2.—6-[α-(3,4,5,6-tetrahydro-2-pyrimidinylthio) acetamido]-penicillanic acid

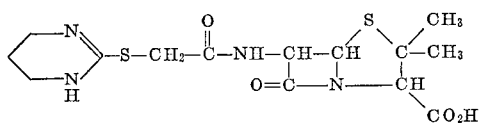

Potassium 6-(α-bromoacetamido)-penicillanate (3.75 grams, 0.01 mole) and 0.84 gram (0.01 mole) of sodium bicarbonate were dissolved in 50 ml. of water. The solution was stirred and 1.16 grams (0.01 mole) of 2-mercapto-3,4,5,6-tetrahydropyrimidine was added at about 20° C. The solution was stirred for two hours after the addition of the mercaptan, following which the solution was extracted twice with two 25 ml. portions of ethyl acetate. The aqueous phase was then acidified to pH 3 with 40% phosphoric acid. The aqueous solution was again extracted with two portions of ethyl acetate. The pH of the aqueous phase was further acidified to pH 2 with more phosphoric acid and the resultant solution was then extracted with a solution of 2.2 grams (0.005 mole) of aerosol OT (a long chain aminosulfonic acid) dissolved in 40 ml. of methyl isobutyl ketone (MIBK). The MIBK layer was washed twice with 50 ml. portions of water, dried over anhydrous sodium sulfate, filtered, and the filtrate then treated with 0.7 ml. (0.005 mole) of triethylamine. The resultant precipitate was collected by filtration, washed with MIBK and air dried. The yield was 0.75 gram, m.p. >130° C. with decomposition. The crystalline product was water soluble.

Analysis.—Calc'd for C$_{14}$H$_{20}$N$_4$O$_4$S$_2$·H$_2$O (percent): C, 43.08; H, 5.69. Found (percent): C, 43.81; H, 6.29.

The infrared (IR) and nuclear magnetic resonance spectra (NMR) were consistent with the structure of the title product.

Example 3.—Preparation of 1,3-diazacycloheptane-2-thione

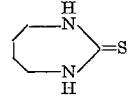

1,4-diaminobutane (88.15 grams, 1 mole) was dissolved in 200 ml. of 95% ethanol and the solution was cooled to below 20° C. The temperature was maintained below 20° C. while 76.13 grams of carbon disulfide was added over a period of thirty minutes. The precipitate was removed by filtration and washed with 100 ml. of 95% ethanol to yield 157.5 grams of solid, M.P. 145–148° C.

The solid product was refluxed in 500 ml. of water for fourteen hours. An oil separated from the mixture during the reflux period. The aqueous phase was removed by decantation. Upon cooling, the aqueous phase deposited crystals. The crystals were collected and recrystallized from 950 ml. of boiling water to yield about 60 grams of 1,3-diazacycloheptane-2-thione, M.P. 177–180° C. Ref: Canadian Journal of Chemistry, 35, 1438–1445 (1957).

Example 4.—6-[α-(1H-4,5,6,7-tetrahydro-1,3-diazepinyl-2-thio)-acetamido]-penicillanic acid

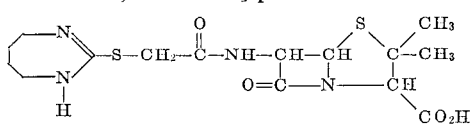

Potassium 6-(α-bromoacetamido)-penicillanic acid (3.75 grams, 0.01 mole), 1.29 grams (0.01 mole) of 1,3-diaza-cycloheptane-2-thione and 0.84 gram (0.01 mole) of sodium bicarbonate were dissolved with stirring in 50 ml. of water at about 20° C. Stirring was continued for 3½ hours following which the solution was filtered and then layered with 50 ml. of ethyl acetate. The mixture was acidified to pH 2 with 40% phosphoric acid. The ethyl acetate phase was discarded. The aqueous phase was extracted with 50 ml. of MIBK containing 2.4 grams of aerosol OT. The MIBK layer was dried over sodium sulfate and then adjusted to pH 6 with triethylamine. The product crystallized, was collected and washed with fresh MIBK. The solid was dried in vacuo to yield 1.44 grams of solid, M.P. >110° C. with decomposition and the IR and NMR were consistent with the structure of 6-[α-(1H-4,5,6,7 - tetrahydro - 1,3 - diazepinyl-2-thio)-acetamido]-penicillanic acid.

Analysis.—Calc'd for C$_{15}$H$_{22}$N$_4$O$_4$S$_2$ (percent): C, 46.67; H, 5.70; N, 14.52; S, 16.57. Found (percent): C, 47.83; H, 6.68; N, 12.46; S, 14.30.

Example 5.—Preparation of 3,4,5,6-tetrahydro-2-pyrimidinylmercaptoacetyl chloride hydrochloride

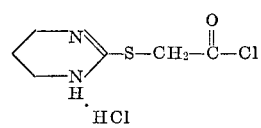

1 mole of 2-mercapto-3,4,5,6-tetrahydro-pyrimidine and 2 moles of sodium hydroxide (sodium carbonate or sodium bicarbonate) are dissolved in 1 liter of water at about 20° C. The solution is vigorously stirred while one mole of bromoacetic acid is slowly added. Stirring is continued for several hours following which the mixture is acidified to about pH 4.5 with acetic acid. The solid is collected by filtration, then redissolved in water and hydrochloric acid. The clear solution is neutralized with 10% sodium hydroxide and the solid collected by filtration to yield 3,4,5,6-tetrahydro - 2 - pyrimidinylthioacetic acid.

The acid is readily converted to the acetyl chloride hydrochloride by a method commonly used in the art, i.e., treatment with $PCl_5$, thionyl chloride etc. The acetyl chloride hydrochloride is then used in situ or as a purified isolate to acylate 6APA.

Example 6.—Preparation of 1H - 4,5,6,7 - tetrahydro-1,3-diazepinyl-2-mercaptoacetyl chloride hydrochloride Substitution in the procedure of Example 5 for the 2-mercapto-3,4,5,6-tetrahydropyrimidine used therein of 2-mercapto-1H-4,5,6,7-tetrahydro - 1,3 - diazepine produces 1H-4,5,6,7-tetrahydro - 1,3 - diazepinyl-2-mercaptoacetyl chloride hydrochloride.

I claim:
1. A compound having the formula

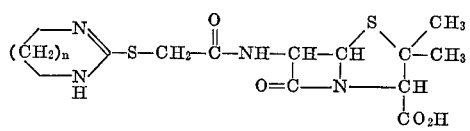

wherein *n* is an integer of 1 or 2, and a pharmaceutically acceptable nontoxic salt thereof.

2. The compound having the formula

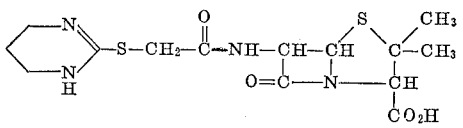

and a pharmaceutically acceptable, nontoxic salt thereof.

3. The compound having the formula

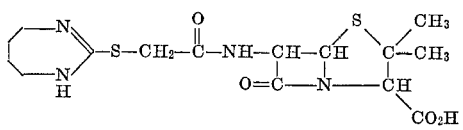

and a pharmaceutically acceptable nontoxic salt thereof.

References Cited
UNITED STATES PATENTS 3,373,155  3/1968  Ekström et al. _____ 260—239.1
3,382,238  5/1968  Dolfini _____ 260—239.1

NICHOLAS S. RIZZO, Primary Examiner

U.S. Cl. X.R.
424—271